Aug. 26, 1969  R. A. HEROLD  3,463,995
ELECTRIC FEEDING INSTALLATION ON INTERNAL COMBUSTION
VEHICLES AND ENGINES
Filed Dec. 27, 1966

INVENTOR
RODOLPHE ANDRÉ HEROLD
BY
ATTORNEYS

United States Patent Office 3,463,995
Patented Aug. 26, 1969

3,463,995
ELECTRIC FEEDING INSTALLATION ON INTERNAL COMBUSTION VEHICLES AND ENGINES
Rodolphe André Herold, Boulogne-Billancourt, France, assignor to Societe des Accumulateurs Fixes et de Traction (Societe Anonyme), Romainville, Seine-Saint-Denis, France, a company of France
Filed Dec. 27, 1966, Ser. No. 604,787
Claims priority, application France, Dec. 28, 1965, 44,057
Int. Cl. H02j 7/14; H01m 45/04
U.S. Cl. 320—6                                  10 Claims

ABSTRACT OF THE DISCLOSURE

The disclosure herein relates to electric power supply apparatus for vehicles and engines equipped with internal combustion engines, an electric starter, and auxiliary loads. The apparatus has a main battery having a high capacity $C$ capable of delivering a maximum current of approximately $2C$ or $3C$ for a short period of time and lower continuous discharge currents for longer periods and a second complementary battery which has the same rated voltage as the main battery and a low capacity $C_0$, but which is capable of delivering a maximum current of $20\,C_0$ to $30\,C_0$ for short periods of time. By the use of various connections, relays, and switches, the main battery alone delivers power to the auxiliary loads while the starter can be powered either by the main battery alone or by both the main and complementary batteries in parallel. Automatic charging of both batteries while the engine is running is provided for with limitation of the charging current to the complementary battery in addition to circuitry to prevent discharge of the complementary battery into the main battery.

Figure 1:
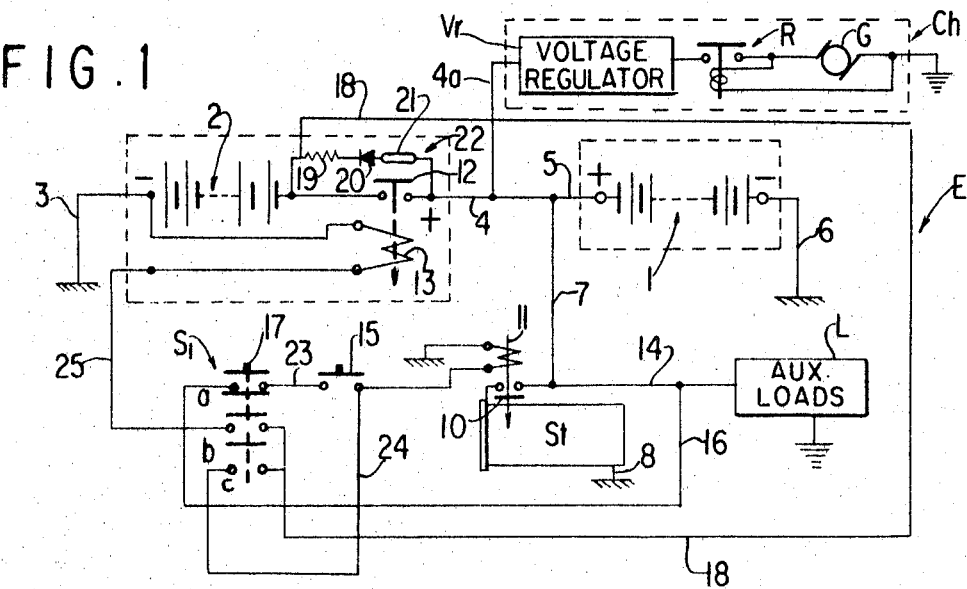

In an embodiment, the main battery is of the lead-acid type and the secondary battery is of the nickel-cadmium type with thin sintered electrode plates, both batteries being suitable for cranking the motor of an engine.

BRIEF SUMMARY OF INVENTION

This invention relates essentially to electric power supply apparatus for internal combustion vehicles and engines, comprising an electric starter and auxiliary loads such as lighting and air conditioning circuits, for instance.

For a long time and still now, it was assumed that one battery should meet all the various needs such as lighting and cranking on a vehicle. Thus, on motor cars and particularly on trucks, the same battery is used as well for lighting or other loads as for cranking. Usually, the capacity of the battery is determined so as to meet the needs for lighting and other loads, which need a large capacity though not a high power, in order to deliver the necessary energy during the required time. Therefore, the same battery should be theoretically sufficient to crank the motor in normal conditions by delivering a high power output for a short time.

Such handling remains satisfactory as long as the conditions for cranking are normal, since the commercial batteries, for instance, of the lead-acid type, can deliver for a short time a maximum current equivalent in amperes to three times the value of the nominal capacity $C$ rated in ampere-hours (discharged in 20 hours) or as actually said a discharge current of $3C$.

However, this solution becomes in practice more and more inadequate because of the ever-increasing powers of motors which requires increased cranking power. Therefore, should a battery be unable to deliver all the required power at the moment of starting, the cranking cannot be accomplished. In this connection, the following facts must be noted.

The internal resistance of a battery tends to increase with aging so that a battery capacity $C$ yielding originally a maximum current of about $3C$ is no longer able, after a certain aging time, to deliver the same current at sufficient voltage; thus, the battery will not provide the required power.

Moreover, low temperatures greatly increase the internal resistance of the battery and as the cranking conditions are also more difficult at low temperatures, the battery becomes unfit for cranking the motor since it cannot deliver the required power even when it is new and in a fully charged state.

Additionally, when the battery is somewhat discharged, the internal resistance increases so that the battery is no more able to deliver the necessary cranking power.

At the present time, batteries of a new type are available, more especially nickel-cadmium batteries with thin sintered plates with very low inner resistance able to withstand either continuous discharges at rates up to $20C$, or intermittent discharges at rates reaching $30C$. However, these batteries are rather expensive compared to conventional batteries of equivalent capacities.

In other words, two different types of batteries, well characterized, are now available:

A first type with an internal resistance of the usual value, which delivers a maximum current of about $2C$ to $3C$, and also normally delivers during several hours a continuous discharge current equal to the usual intensity of the battery, practically $C20$ which can ensure, for instance, the lighting of vehicles as well as all other auxiliary loads.

A second type having a very low internal resistance which is characterized by its ability to provide high discharge rates, i.e., having high power for a low capacity. Such batteries are quite suitable for motor cranking.

However, considering their high cost, it is not generally possible to use the low resistance batteries for supplying the power for the lighting and various other auxiliary loads. Such lighting and load circuits indeed require large amounts of electric energy and, therefore, the capacity of the battery must be very high.

On the other hand, if a battery of the first type were to be designed to supply at any moment, in all circumstances the required cranking power, this battery would have to be oversize. In fact, this would lead to a requirement of double the capacity corresponding to the needs of lighting and auxiliary loads, thus involving many drawbacks, principally in requiring increased weight and volume.

For vehicle motor cranking under different conditions, the use of an emergency battery has already been proposed, this battery being substituted for the eventually failing main battery. This solution is not always efficient, and its effect is not permanent. When the failure is caused by a low temperature, the use of an emergency battery is not a remedy. When the failure results from a partly discharged main battery, the emergency battery may also fail soon thereafter for the same reasons.

An object and feature of this invention is to provide a solution for the above-mentioned difficulties. According to this invention, the electric power source on vehicles and engines driven by internal combustion motors is especially noteworthy in that it comprises provision of a first so-called main battery having a high capacity $C$ which can deliver for short periods of time a current at a maximum rate of $2C$ or $3C$, for example (i.e., twice to three times rated capacity), and a second so-called complementary battery having a low capacity $C_0$, having the same rated voltage as that of the main battery, which can deliver for short times a current at a maximum rate of $20C_0$ to $30C_0$, for example (i.e., 20 to 30 times rated capacity). The main battery is able to supply power to all the auxiliary loads by itself, while the starter may be fed either by the main battery only or by the main and complementary batteries in parallel connection. Obviously, in such circumstances, it is possible to crank the motor under any condition even when the main battery of the conventional type has no more than the necessary power for feeding the auxiliary loads, provided that a complementary battery of very small capacity reduced in weight and volume, is also used. In the best cranking conditions, with a fully charged main battery at a mild ambient temperature, the cranking will be accomplished by merely connecting the starter to the terminals of the main battery alone. On the contrary, for inauspicious cranking conditions, either because the main battery is partly discharged or because the ambient temperature is rather low, or for both reasons, the main battery should be parallel connected with the complementary battery which latter will then supply the complementary current required for the cracking to the starter, since this battery has a very low internal resistance and is able to deliver high discharge currents equivalent in amperes to twenty or thirty times the value in ampere hours of its rated capacity.

According to another object and feature of the invention, the main battery is a conventional battery of the lead-acid type whereas the complementary battery is of the cadmium-nickel type, preferably with thin sintered plates. A lead-acid battery which is capable ordinarily of storing large amounts of energy is usually quite suitable for supply power to the lighting and usual loads circuits on vehicles and engines, whereas a cadmium-nickel battery capable of yielding high instantaneous power is quite suitable for supplying power to the starter, each of the two parallel connected batteries delivering then, in their own best operating conditions, a part of the electric energy or load required for cranking. In addition, the cadmium-nickel complementary battery has the advantage of having a very long life so that the said battery can be used repetitively when for whatever reason the main battery is out of order and needs to be replaced by a new battery.

According to still another object and feature of the invention, the rated voltages of both said batteries, namely, the so-called "main" and "complementary" batteries, must be the same, so that the respective numbers of their cells are equal when both batteries are of the same type, or different when the batteries are of different type. Thus, for example, 19 cadmium-nickel cells will correspond to 12 lead-acid cells.

According to still another feature and object of the invention, the capacities of the main and complementary batteries are in a ratio approximately equal to the product of the ratio of the respective internal resistances of the component cells, and the ratio of the respective numbers of the series connected cells in each battery.

In other words, it has been said that the maximum discharge currents of the batteries were limited by the internal resistances of the said batteries. If, for instance, a main battery cell has the same rated voltage (especially in batteries of the same type, cadmium-nickel or lead-acid, for example), as a complementary battery cell, and if the internal resistance of the complementary battery cell is five times smaller than that of the main battery cell, a calculation shows that to obtain the best performance for the two parallel connected batteries, it is advantageous to fix the complementary battery capacity at one fifth of the main battery capacity.

If, on the contrary, the main battery cells (lead-acid for instance) have a rated voltage (approximately 2 volts in this case) different from that of the complementary cells (nickel-cadmium, for instance, about 1.26 volts) since the two batteries must have the same rated voltage, it is necessary to match a main battery composed of 12 series connected lead-acid cells with a complementary battery composed of 19 series connected nickel-cadmium cells. As above, a calculation shows that it is advantageous to chose the capacities of the two batteries according to the ratio of the cell's internal resistances corrected by a factor which is the ratio of the respective numbers of cells. Therefore, assuming an internal resistance five times greater in the lead-acid cell of the main battery than that of the cadmium-nickel cell of the complementary battery, the complementary battery capacity would be advantageously chosen as approximately one third of the main battery capacity ($\frac{1}{5} \times \frac{19}{12}$=approximately $\frac{1}{3}$).

This ratio may be selected as one-fourth, since the complementary battery is never discharged alone but only in parallel with the main battery.

Other objects and features of the invention will appear in the course of the following description, referring to the annexed drawings which are presented solely but non-exclusively, as examples.

DRAWINGS

Figure 2:
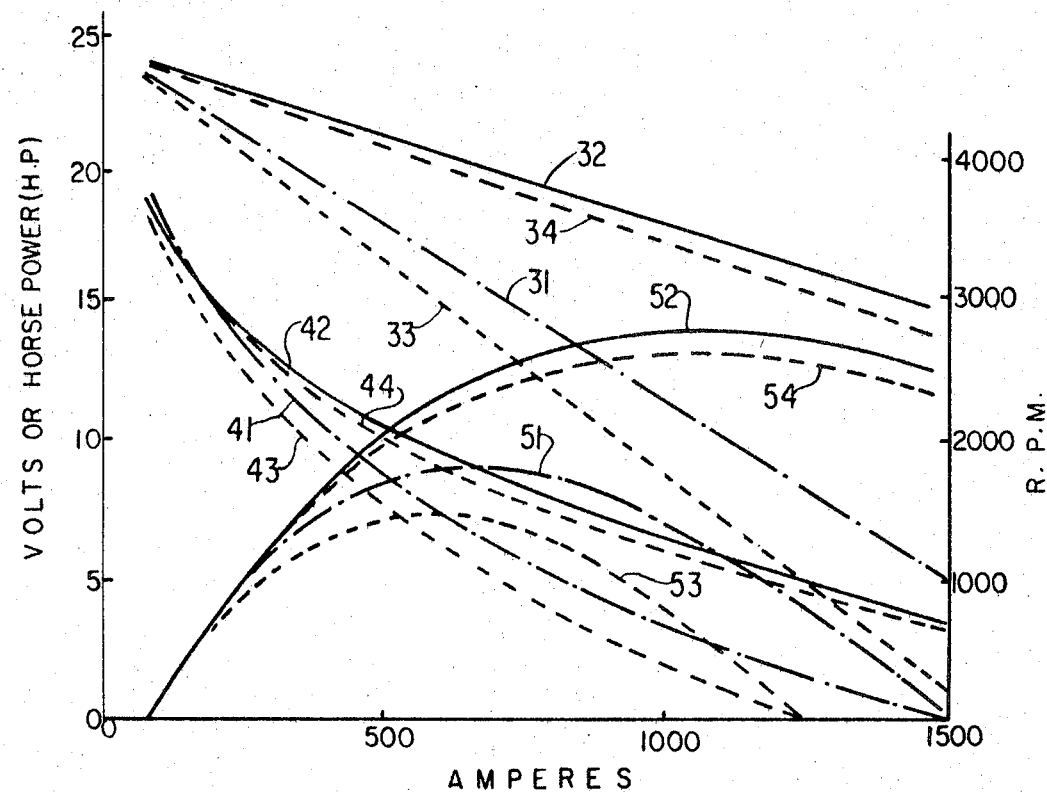
Figure 3:
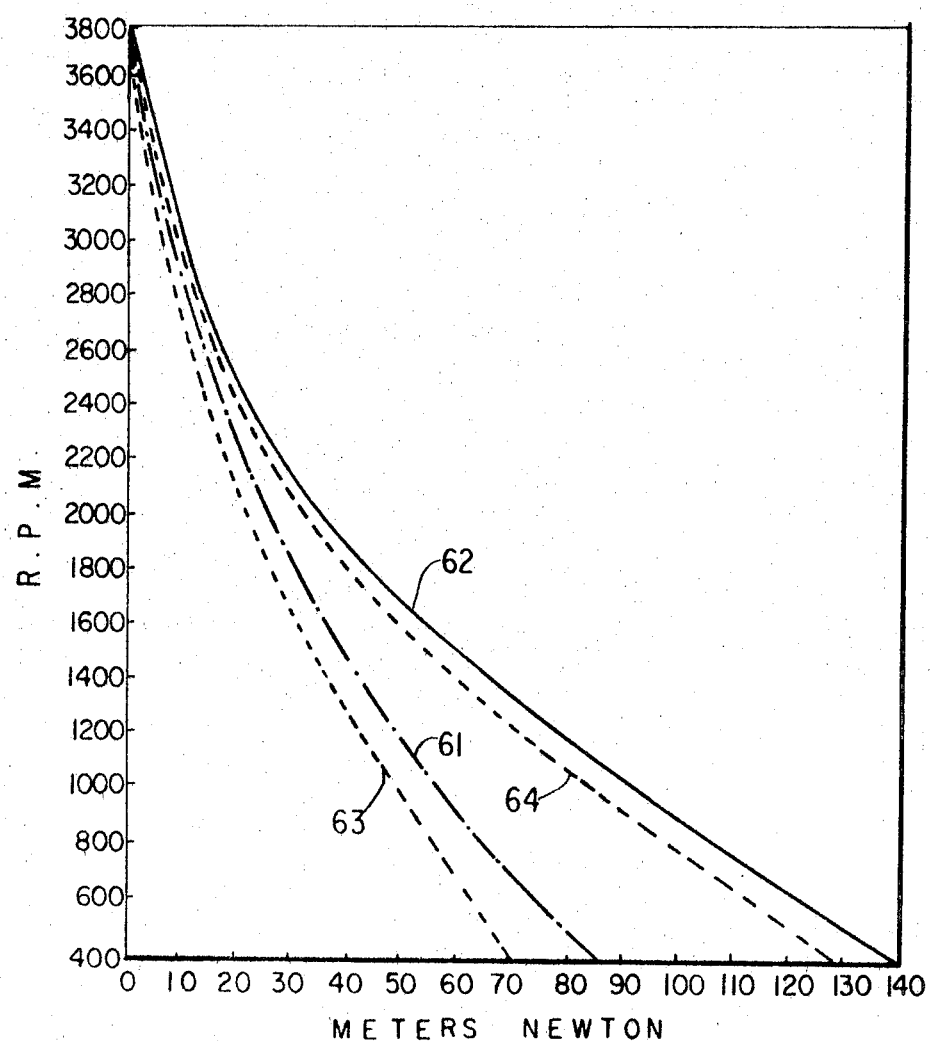

In the accompanying drawings forming part hereof,

FIGURE 1 diagrammatically shows the circuits of an electric apparatus embodying the invention;

FIGURE 2 shows curves relative to various battery combinations, showing either the voltage at terminals, or the cranking in horsepower, or the angular speed in r.p.m. as functions of the current in amperes; and FIGURE 3 shows curves plotted from data derived from FIGURE 2 relative to the starter speed as ordinates expressed in revolutions per minute (r.p.m.) as a function of the torque as abscissae expressed in meters, Newton.

DETAILED DESCRIPTION

According to the embodiment shown in FIGURE 1 of the attached drawings an electric apparatus E of a vehicle or engine driven by an internal combustion motor, comprising an electric starter $St$ and auxiliary loads L in accord with the invention, essentially comprises a first battery 1, the so-called main battery, having a high capacity, which is preferably of the lead acid type, for instance, and a second battery 2, the so-called complementary battery having a relatively low capacity, but a high power preferably of the alkaline cadmium-nickel type, for example. The numbers of cells of each battery 1 and 2 are chosen so that the rated voltage of the two batteries is about equal.

Conductive wires 3 to 8 having large sections and large current carrying capacities are connected between the batteries 1 and 2 subject to being parallel connected across the starter $St$. The return circuits of the wires 3, 6 and 8, are, of course, constituted by ground. A first movable contact 10 is controlled by a relay 11 and is in series connection with the wire 7. A second movable contact 12 controlled by a relay 13 is in series connection with the wire 4. The two positive terminals of the batteries 1 and 2 are connected by wires 5 and 4 to wire 7, the movable contact 12 being located between the positive terminal of the complementary battery 2 and the wires 4 and 7. The load circuit L is connected to the wire 7 through wire 14 and ground. Such a load circuit is, for instance, intended for lighting or any of the various loads other than the starter $St$ on the vehicle or engine in which the apparatus according to the invention, is embodied.

A lead 16 connected to wire 14 crosses the normally closed standby position $a$ of a multiple pushbutton switch $S_1$ which is controlled by a push button 17 and through lead 23 is connected to a second normally open pushbutton switch 15 to provide for current supply of the operating coil of relay 11.

The multiple pushbutton switch $S_1$ is provided at a position $b$ with normally open contacts on the one hand for the purposes when closed of supplying the operating coils of relays 11 and 13 via the lead 18 connected to the positive terminal of the complementary battery 2 and via the leads 24 and 25 respectively connected to the operating coils of relays 11 and 13, and on the other hand when switch $S_1$ is closed to by-pass the current leads going to the pushbutton 15.

A charging circuit 22 is provided for the complementary battery 2 and comprises a resistor 19 limiting the intensity of the charging current, a diode 20 or a rectifier allowing the passage of the current exclusively in one direction for charging the battery 2, and a safety fuse 21. The said charging circuit 22 can be short circuited by bridging action of the movable member 12 of the relay 13 when the latter is energized.

The operation of the apparatus such as described hereabove will not be described. When the motor or engine is running normally, and also the vehicle or the engine itself, the main battery 1 normally delivers the necessary current required by the vehicle via cable 7 and lead 14. In the meanwhile, the charging device $Ch$, e.g., a dynamo or generator G driven by the motor and including a conventional cutout relay R and voltage regulator $V_R$ connected by wire $4a$ to conductive wires 4 and 5, as long as the motor is running, is constantly charging the main battery 1 and also the complementary battery 2. The charging circuit 22 limits charge of battery 2 to a low charging current. Moreover, the complementary battery 2 does not supply any current to the load L since the movable contact 12 is in open circuit position because the relay 13 is not at this time energized as the contacts at position $b$ of switch $S_1$ are open. Also, the battery 2 cannot discharge into the batter 1 due to the suitably polarized diode or recifier 20.

Assuming that the motor or engine is stopped, its cranking will necessitate first pressing the usual starting pushbutton 15. The coil of relay 11 is thus energized, and its movable contact 10 moves to circuit-closing position and the main battery 1 alone supplies power to the starter $St$. If the main battery 1 is fully charged at this time and the temperature is not unfavorable, the cranking operation proceeds normally. On the contrary, if the main battery 1 is then partly discharged or if the environmental temperature is low, main battery 1 may then not be able to supply sufficient current to operate the starter $St$ and the motor might not be cranked.

Then it becomes necessary to press the second button 17, energizing simultaneously at $b$ and $c$, the coil of relay 13 which operates the movable contact 12 to close circuit position and also energizing the coil of relay 11 which operates its movable contact 10 to circuit closing position, thus parallel connecting the complementary battery 2 to the main battery 1. Then, while pushbutton 17 remains depressed, the two batteries simultaneously deliver current to the starter $St$. As the complementary battery 2 is then fully charged since it has not been previously discharged in auxiliary loads, and as this complementary battery is designed to deliver very high power during short times, the two batteries will provide sufficient power to operate the starter $St$ and the motor will very readily be cranked. As soon as the cranking is effected, the pushbutton 17 is released, opening the circuits at $b$ and $c$ to the respective coils of relays 11 and 13 and consequently, the batteries 1 and 2 are normally charged by the charging device $Ch$ on the vehicle while starter $St$ becomes disconnected at relay 11. The battery 1 again acts solely to deliver current to run the engine and the auxiliary loads on the vehicle.

Referring now to FIGURES 2 and 3 of the drawings, the curves show the advantages resulting from the practice of this invention. For this purpose, the curves 31, 32, 33, 34 in FIGURE 2 are plots of voltages in volts (ordinates) as a function of the discharge current in amperes (abscissae) respectively, either from a fully charged main battery alone (curve 31) or a fully charged main battery parallel connected to a fully charged complementary battery (curve 32) or a half-discharged main battery alone (curve 33) or a half-discharged main battery parallel connected to a fully charged complementary battery (curve 34).

In the same way, the curves 41, 42, 43, 44 are plots respectively of speed in revolutions per minute (r.p.m.) (ordinates) of the starter as a function of the current in amperes (abscissae) delivered to the starter either by a fully charged main battery alone (curve 41) or a fully charged main battery parallel connected to a fully charged complementary battery (curve 42) or a half-discharged main battery alone (curve 43) or a half-discharged main battery parallel connected to a fully charged complementary battery (curve 44).

The curves 51, 52, 53, 54 are plots related to the power expressed in horsepower delivered by the starter (ordinates) as a function of the current in amperes (abscissae) supplied to the starter either by a fully charged main battery alone (curve 51) or a fully charged main battery parallel connected to a fully charged complementary battery (curve 52) or a half-discharged main battery alone (curve 53) or a half-discharged main battery parallel connected to a fully charged complementary battery (curve 54).

In the same way, FIGURE 3 are plots of four curves 61, 62, 63, 64 showing the speed of the starter in revolutions per minute (r.p.m.) as ordinates as a function of the opposing torque abscissae expressed in meters, Newton, when the starter is fed either from a fully charged main battery alone (curve 61), or a fully charged main battery parallel connected to a fully charged complementary battery (curve 62) or a half-discharged main battery alone (curve 63) or a half-discharged main battery parallel connected to a fully charged complementary battery (curve 64).

The various curves in FIGURES 2 and 3 have been plotted from the data derived from a starter associated with an internal combustion motor of 6 liters capacity, and fed by a main battery 1 and a complementary battery 2, each able to deliver in a fully charged state the same power to the starter.

The capacity of the main battery (which was a lead-acid battery of 12 cells) was 160 ampere-hours, whereas the capacity of the complementary battery (which was a nickel-cadmium battery of 19 thin sintered plate cells) was 20 ampere-hours.

The curves of FIGURES 2 and 3 show that it is possible to obtain much more satisfactory results with the use of a fully charged complementary battery parallel connected to a fully charged or even to a half-discharged main battery, than with the use alone of one main battery even when the latter is fully charged. The improvement provided by the invention is clear.

Particularly from FIGURE 3 it can be seen that, in the most frequent case (curve 64) of a partly discharged main battery, the use of a parallel connected complementary battery (always in a fully charged state) provides a driving torque 70% greater than that developed with the main battery alone at the lowest admissible speed of about 1000 r.p.m. required, for example, to crank the motor.

The results can be further improved if the complementary battery supplies a power greater than that given by the fully charged main battery at the instant of the cranking. For instance, when the main battery is of the lead-acid type and the complementary battery is of the cadmium-nickel type with thin sintered plates, the lead acid battery, when in a good state and in a fully charged condition, can deliver a current measured in amperes equal to about 2 or 3 times its capacity expressed in ampere hours, and under the same conditions the cadmium-nickel battery can deliver a current measured in amperes equal to about 20 or 30 times its capacity expressed in ampere-hours. If the complementary battery capacity has been chosen as one fifth of the main battery capacity, the respective powers simultaneously delivered for starting with both fully charged parallel connected batteries are in the ratio of about two to one.

While specific embodiments of the invention have been disclosed herein, variations within the scope of the appended claims are possible and are contemplated. There is no intention, therefore, of limitation to the exact disclosure herein presented.

What is claimed is:

1. Electric power supply apparatus for internal combustion motor driven devices equipped with electrically operated starting means and auxiliary electric loads comprising a main battery having a high capacity and selected rated voltage and capable of supplying a maximum current output in amperes equivalent to up to approximately three times the value in ampere hours of the rated capacity of said battery, a second complementary battery having a low rated capacity, with a rated voltage equal substantially to the rated voltage of the main battery, said complementary battery being capable of delivering for short periods of time a maximum current output in amperes equivalent to from approximately twenty to approximately thirty times the value of its rated capacity in ampere hours, charging means for both batteries at different rates, circuit means connecting the said main battery so that it alone supplies power to the auxiliary electric loads, circuit means connecting the main battery and the complementary battery to said electrically operated starting means, and switching means in said last-named circuit means for selectively supplying said starting means with operating current from the main battery alone if in sufficiently charged state or by both the main and the complementary batteries in parallel connection if the main battery alone is insufficient.

2. Electric power supply apparatus according to claim 1 wherein said switching means includes a pair of relays normally in open circuit condition and pushbutton type circuit closing means for energizing both said relays simultaneously from said complementary battery and putting them into circuit closed condition respectively for connecting both said batteries in parallel and for connecting the starting means to the parallelly connected batteries.

3. Electric power supply apparatus according to claim 2 including an independent pushbutton circuit closing means in addition to said first-named push button circuit closing means normally in open circuit condition connected with that one of said relays whose energization connects the starting means to the batteries, operation of said additional independent pushbutton circuit closing means to closed circuit condition serving to supply said starting means with current derived only from said main battery, said two pushbutton circuit closing means being located in proximity to each other so that the first-named one thereof may be operated readily in the event of main battery failure to effect simultaneous parallel connected power supply from both batteries to said starting means.

4. Electric power supply apparatus according to claim 1 including generator means connected to said main battery for charging it while the motor is running, and a charging circuit connected to said generator means and said complementary battery to charge the latter simultaneously at a reduced current relative to the charge current supplied to the main battery.

5. Electric power supply apparatus according to claim 4 wherein said charging circuit comprises a resistor, one-way semiconductive means and a fuse in series connection between the generator means and the positive terminal of said complementary battery.

6. An electric power supply apparatus for internal combustion motor driven devices equipped with electrically operated starting means and auxiliary electric loads comprising a main battery having a high capacity and selected rated voltage and capable of supplying a maximum current output in amperes equivalent to up to approximately three times the value in ampere hours of the rated capacity of said battery, a second complementary battery having a low rated capacity, with a rated voltage equal substantially to the rated voltage of the main battery, said complementary battery being capable of delivering for short periods of time a maximum current output in amperes equivalent to from approximately twenty to approximately thirty times the value of its rated capacity in ampere hours, charging means for both batteries at different rates, circuit means connecting the said main battery so that it alone supplies power to the auxiliary electric loads, circuit means connecting the main battery and the complementary battery to said electrically operated starting means, switching means in said last-named circuit means for selectively supplying said starting means with operating current from the main battery alone if in sufficiently charged state or by both the main and the complementary batteries in parallel connection if the main battery alone is insufficient, said charging means including generator means connected to said main battery for charging it while the motor is running, and a charging circuit connected to said generator means and said complementary battery to charge the latter simultaneously at a reduced current relative to the charge current supplied to the main battery, said charging circuit comprises a resistor, oneway semiconductive means and a fuse in series connection between the generator means and the positive terminal of said complementary battery, and including means for short circuiting said charging circuit.

7. Electric power supply apparatus according to claim 6, wherein said main battery is a lead acid battery.

8. Electric power supply apparatus according to claim 6, wherein said complementary battery is a cadmium-nickel battery with thin sintered plates.

9. Electric power supply apparatus according to claim 6, wherein said main battery is a lead acid battery and said complementary battery is an alkaline electrolyte cadmium-nickel battery.

10. Electric power supply apparatus according to claim 6, wherein said main and said complementary batteries have capacities in a ratio approximately equal to the number obtained by multiplying the ratio of the respective internal resistances of their cells and the ratio of the respective numbers of series connected cells in the two batteries.

References Cited

UNITED STATES PATENTS

| | | | |
|---|---|---|---|
| 1,396,541 | 11/1921 | Thomson | 320—17 X |
| 2,761,978 | 9/1956 | Piumi | 320—16 X |
| 3,021,469 | 2/1962 | Ganiere et al. | 320—16 X |
| 3,341,762 | 9/1967 | Rockoff | 320—6 |

JOHN F. COUCH, Primary Examiner

STANLEY WEINBERG, Assistant Examiner

U.S. Cl. X.R.

307—48; 320—24